US008984648B2

(12) United States Patent
Marcovecchio et al.

(10) Patent No.: US 8,984,648 B2
(45) Date of Patent: Mar. 17, 2015

(54) METHOD AND DEVICE FOR MANAGING A SECURE ELEMENT

(75) Inventors: Vincenzo Kazimierz Marcovecchio, Ottawa (CA); Ravi Singh, Toronto (CA)

(73) Assignee: BlackBerry Limited, Waterloo (CA)

( * ) Notice: Subject to any disclaimer, the term of this patent is extended or adjusted under 35 U.S.C. 154(b) by 72 days.

(21) Appl. No.: 13/597,327

(22) Filed: Aug. 29, 2012

(65) Prior Publication Data
US 2013/0160134 A1    Jun. 20, 2013

Related U.S. Application Data

(60) Provisional application No. 61/576,162, filed on Dec. 15, 2011.

(51) Int. Cl.
G06F 7/04 (2006.01)
G06Q 20/20 (2012.01)
G06Q 20/32 (2012.01)
G06Q 20/34 (2012.01)
G06Q 20/36 (2012.01)
G06Q 20/40 (2012.01)
H04L 29/06 (2006.01)

(52) U.S. Cl.
CPC .......... *G06Q 20/3563* (2013.01); *G06Q 20/204* (2013.01); *G06Q 20/3227* (2013.01); *G06Q 20/3229* (2013.01); *G06Q 20/3278* (2013.01); *G06Q 20/354* (2013.01); *G06Q 20/3552* (2013.01); *G06Q 20/3574* (2013.01); *G06Q 20/363* (2013.01); *G06Q 20/40975* (2013.01); *H04L 63/1433* (2013.01); *H04L 2463/102* (2013.01)
USPC .......................................................... 726/26

(58) Field of Classification Search
None
See application file for complete search history.

(56) References Cited

U.S. PATENT DOCUMENTS

| 8,196,131 | B1 * | 6/2012 | von Behren et al. .......... 717/168 |
| 2010/0130254 | A1 | 5/2010 | Kamada |
| 2010/0198728 | A1 | 8/2010 | Abaye et al. |
| 2010/0323681 | A1 * | 12/2010 | Corda et al. .................. 455/419 |
| 2011/0113473 | A1 | 5/2011 | Corda et al. |

FOREIGN PATENT DOCUMENTS

| WO | 2011041447 A2 | 4/2011 |
| WO | 2011068448 A1 | 6/2011 |

OTHER PUBLICATIONS

Java Card™ & STK Applet Development Guidelines; Ver 2.0; Gemalto; Reference: WG.GGS.4.0042 (53 pages). Dec. 1, 2009.
The Mobile Payments and NFC Landscape: A U.S. Perspective; A Smart Card Alliance Payments Council White Paper; Publication Date: Sep. 2011; Publication No. PC-11002 (53 pages).
"Security of Proximity Mobile Payments", Smart Card Alliance; Smart Card Talk: Feature of the Month; May 2009 (7 pages).

(Continued)

*Primary Examiner* — Brandon Hoffman
(74) *Attorney, Agent, or Firm* — Ridout & Maybee LLP

(57) ABSTRACT

A method and system for managing, from a communication device, a secure element for contactless transactions such as mobile payment applications. The communication device includes a memory for storing one or more device applications. The method includes determining that an application stored on the secure element does not have an association with any of the device applications, and in response to the determining, sending a communication to a server to delete the application from the secure element.

20 Claims, 6 Drawing Sheets

(56) References Cited

OTHER PUBLICATIONS

Extended European Search Report dated Mar. 25, 2013 for corresponding European Application No. 12182196.1.

Raja Naeem Akram et al: "A Paradigm Shift in Smart Card Ownership Model", Computational Science and its Application (ICCSA), 2010 International Conference on, IEEE, Piscataway, NJ, USA, Mar. 23, 2010.

* cited by examiner

METHOD AND DEVICE FOR MANAGING A SECURE ELEMENT

CROSS-REFERENCE TO RELATED APPLICATIONS

This application claims the benefit of U.S. Application No. 61/576,162 filed Dec. 15, 2011, the contents of which are herein incorporated by reference.

TECHNICAL FIELD

Example embodiments relate to the field of contactless transaction systems such as for mobile payments.

BACKGROUND

Some mobile payment systems include a device having a secure element which can be used for secure transactions, for example to purchase an item using the device rather than a credit card. The secure element may have a limited amount of space for applications to be installed.

In some existing conventional systems, a user may delete or de-activate a user application or device application involved in the mobile payment system. However, the user may be unaware that secure information may remain in the secure element.

Additional difficulties with existing systems may be appreciated in view of the detailed description below.

BRIEF DESCRIPTION OF THE DRAWINGS

Embodiments will now be described, by way of example only, with reference to the attached Figures, wherein.

Like reference numerals are used throughout the Figures to denote similar elements and features.

DETAILED DESCRIPTION OF EXAMPLE EMBODIMENTS

Example embodiments generally relate to contactless transaction systems such as for mobile payments. Example embodiments generally relate to the managing of a secure element from a communication device, which includes the removal of any "orphaned" applets from the secure element which are not associated with any of the device applications.

In accordance with an example embodiment, there is provided a method for managing, from a communication device, a secure element, the communication device having a memory for storing one or more device applications. The method includes determining that an application stored on the secure element does not have an association with any of the device applications, and in response to said determining, sending a communication to a server to delete the application from the secure element.

In accordance with another example embodiment, there is provided a communication device, including a processor, memory for storing one or more device applications, a secure element, a communication subsystem for sending and receiving communications with a server. The processor is configured for determining that an application stored on the secure element does not have an association with any of the device applications, and in response to said determining, sending a communication to the server to delete the application from the secure element.

In accordance with another example embodiment, there is provided a non-transitory computer readable medium having stored thereon instructions executable by a processor for managing a secure element, the medium storing one or more device applications. The instructions include instructions for: determining that an application stored on the secure element does not have an association with any of the device applications, and in response to said determining, sending a communication to a server to delete the application from the secure element.

Figure 1:
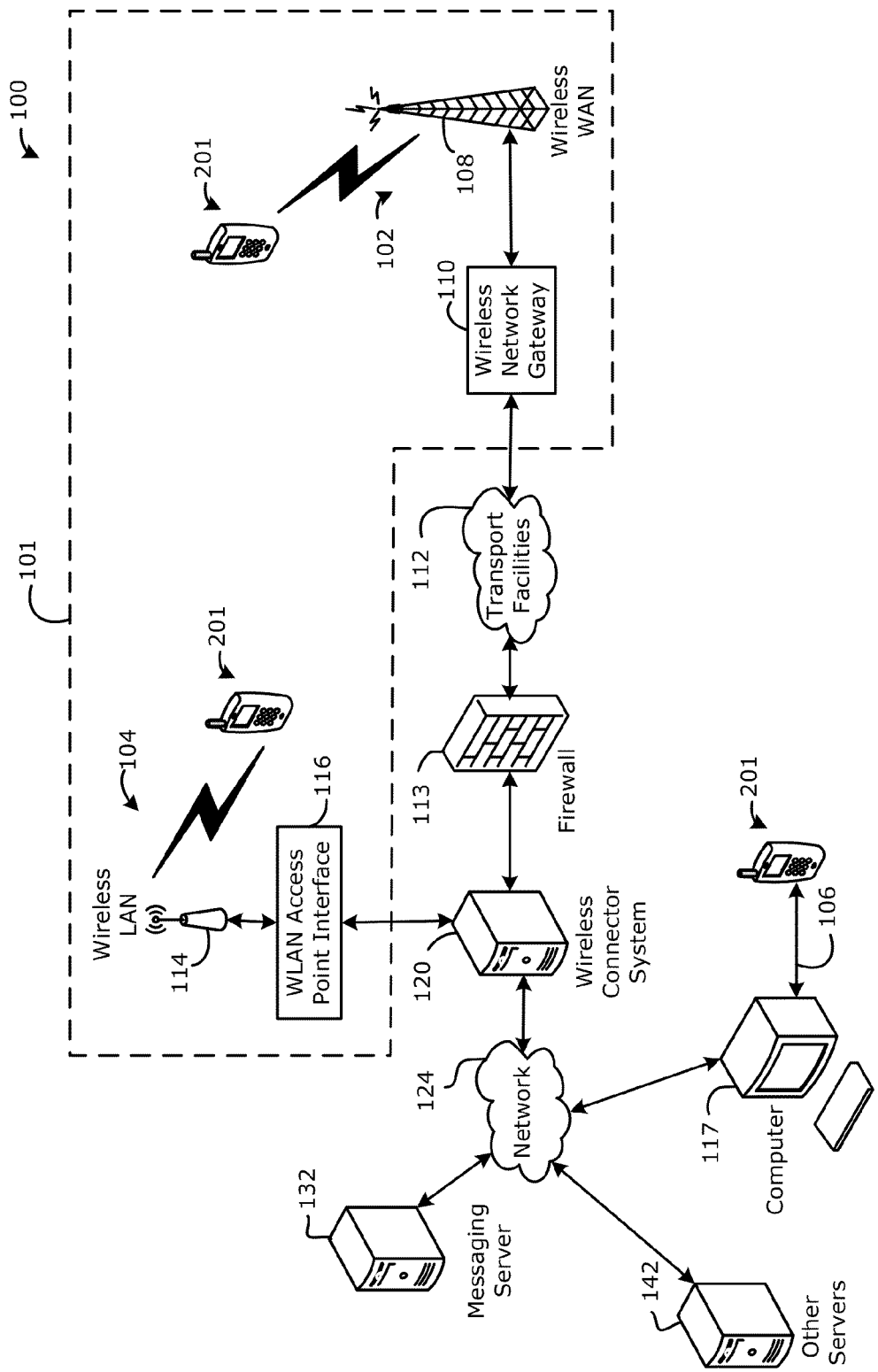
FIG. 1 illustrates a block diagram of a communications system to which embodiments may be applied.

Reference is first made to FIG. 1 which shows in block diagram form a communication system 100 in which example embodiments can be applied. The communication system 100 comprises a number of mobile communication devices (mobile devices) 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless communication network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA/HSUPA (High-Speed Downlink Packet Access/High-Speed Uplink Packet Access), Long Term Evolution (LTE) by 3rd Generation Partnership Project (3GPP), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider or mobile network operator (MNO). In some embodiments, the network 124 may be realised using the internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email messaging server) and optionally other servers 142. The other servers 142 may comprise a content server for providing content such as internet content or content from an organization's internal servers to the mobile communication devices 201 in the wireless network 101, an application server for implementing server-based applications such as instant messaging (IM) applications, or a web server for providing content accessible by a web browser.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

Encryption keys used for communications or for encrypting data stored on the device can be protected via various means such as a password or hardware-based protections, such as those afforded by hardware-based key stored mechanisms.

The wireless network gateway 110 is adapted to send data packets received from the mobile device 201 over the WWAN 102 to the wireless connector system 120. The wireless connector system 120 then sends the data packets to the appropriate connection point such as the messaging server 132, or other servers 142. Conversely, the wireless connector system 120 sends data packets received, for example, from the messaging server 132, or other servers 142 to the wireless network gateway 110 which then transmit the data packets to the destination mobile device 201. The AP interfaces 116 of the WLAN 104 provide similar sending functions between the mobile device 201, the wireless connector system 120 and network connection point such as the messaging server 132, or other servers 142.

The network 124 may comprise a private local area network, metropolitan area network, wide area network, the public internet or combinations thereof and may include virtual networks constructed using any of these, alone, or in combination.

A mobile device 201 may alternatively connect to the wireless connector system 120 using a computer 117, such as desktop or notebook computer, via the network 124. A link 106 may be provided for exchanging information between the mobile device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the Bluetooth® special interest group, IEEE 802.15.3a, also referred to as UltraWideband (UWB), a direct mode communication, Near Field Communication (NFC) or other PAN connection.

It will be appreciated that the described communication system 100 is provided for the purpose of illustration only, and that the above-described communication system comprises one possible communication network configuration of a multitude of possible configurations for use with the mobile communication devices 201. Example embodiments may be employed in connection with any other type of network and associated devices that are effective in implementing or facilitating wireless communication. Suitable variations of the communication system will be understood to a person of skill in the art and are intended to fall within the scope of the present example embodiments.

Figure 2:
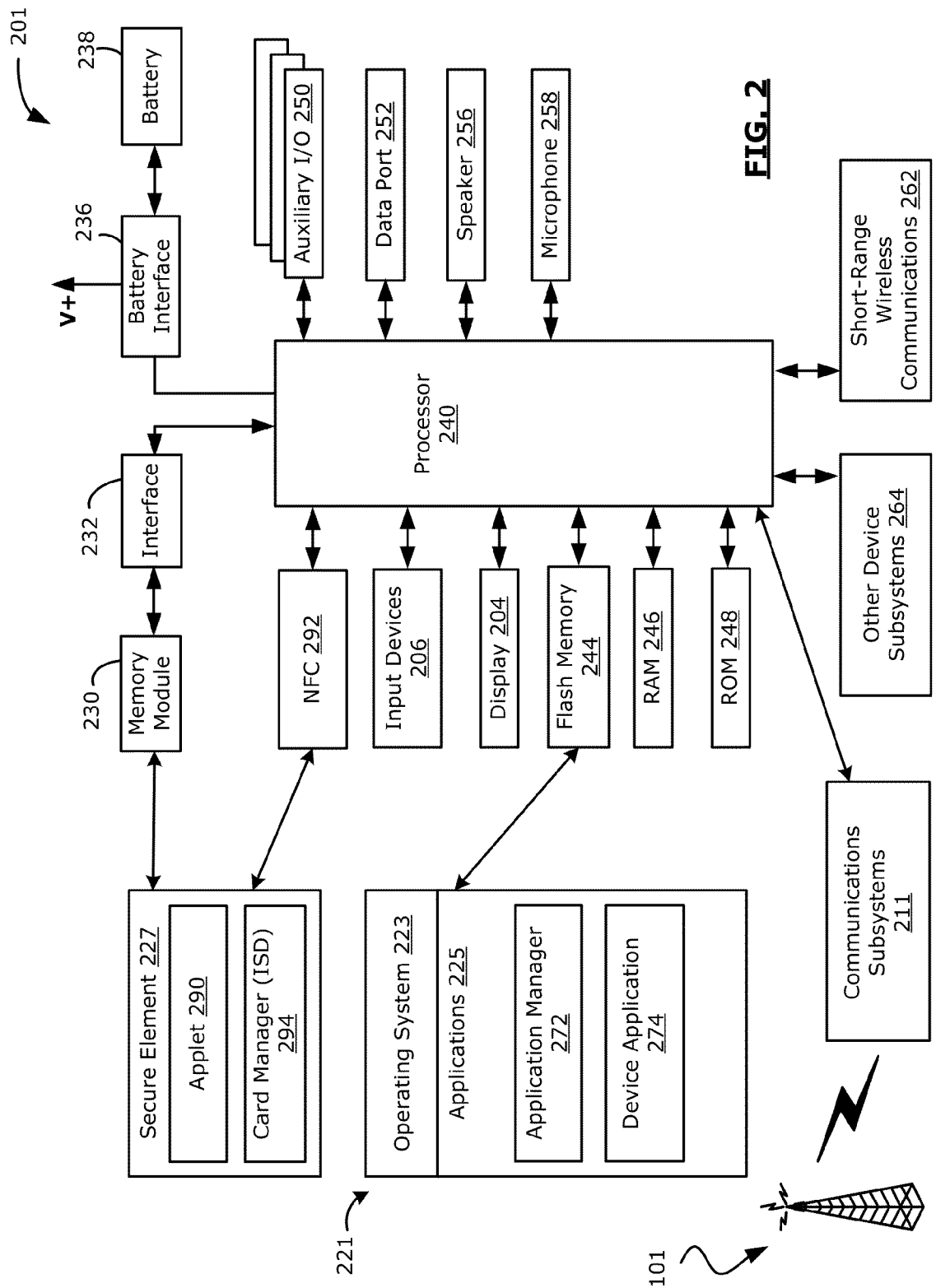
FIG. 2 illustrates a block diagram showing an example embodiment of a mobile communication device that can be used in the communications system of FIG. 1.

Reference is now made to FIG. 2 which illustrates a mobile communication device 201 in which example embodiments can be applied. The mobile device 201 is a two-way communication device having data and optionally voice communication capabilities, and the capability to communicate with other computer systems, for example, via the Internet. Depending on the functionality provided by the mobile device 201, in various embodiments the device 201 may be a multiple-mode communication device configured for both data and voice communication, a smartphone, a mobile telephone or a PDA (personal digital assistant) enabled for wireless communication, or a computer system with a wireless modem.

The mobile device 201 includes a case (not shown) housing the components of the device 201. The internal components of the device 201 are constructed on a printed circuit board (PCB). The mobile device 201 includes a controller comprising at least one processor 240 (such as a microprocessor) which controls the overall operation of the device 201. The processor 240 interacts with device subsystems such as a wireless communication subsystem 211 for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The mobile device 201 may communicate with any one of a plurality of fixed transceiver base stations 108 (FIG. 1) of the wireless network 101 within its geographic coverage area. The mobile device 201 may send and receive communication signals over the wireless network 101 after the required network registration or activation procedures have been completed.

In some embodiments, the mobile device 201 includes a removable memory card 230 or memory (typically comprising flash memory) and a memory card interface 232. The mobile device 201 may include a secure element 227 stored on the removable memory card 230 in some example embodiments. In other example embodiments, the secure element 227 is stored or embedded in the mobile device 201. A contactless element illustrated as Near Field Communication (NFC) module 292 may communicate with the secure element 227, and may act as a communication proxy for any desired communications or configurations made to the secure element 292.

In some example embodiments, the secure element 227 includes one or more secure element applications which may implement secure services or functions, which may also be referred to as "applets" 290. An applet 290 may be identified by an applet identifier (AID). A card manager 294 of the secure element 227 may be designated to manage functions on an Issuer Security Domains (ISD) to provide card management functions on the secure element 227. Example card management functions may relate to the applets 290, such as addition, modification, or deletion of an applet 290.

The processor 240 operates under stored program control and executes software modules 221 stored on memory such as persistent memory, for example, in the flash memory 244. As illustrated in FIG. 2, the software modules 221 comprise operating system software 223 and software applications 225, which for example, may include an application manager 272 and one or more device applications 274. The application manager 272 may include an application program interface (API) for specifically communicating with the NFC module 292 and typically indirectly (e.g. via a proxy) with the applets 290.

In some example embodiments, the communication device 201 may implement Java for interfacing with the secure element 227; for example using JSR 177, to access secure elements, and JSR 257, to access the NFC module 292. In some example embodiments, the communication device 201 may not support Java, and a similar or equivalent implementation of APIs may be used to access the secure element 227 and NFC module 292.

Other example software applications 225 include a short messaging application (e.g. instant messaging, SMS (Short Message Service), MMS (Multimedia Messaging Service, etc.), a web browser, and an email messaging application. In some example embodiments, the functions performed by each of the applications 225 may each be realized as a plurality of independent elements, and any one or more of these elements may be implemented as parts of other software applications 225.

In some examples, the software applications 225 may be implemented using a number of services which define the communication protocols used to communicate between a server and an application 225 on the communication device 201. Some applications may only connect to a single type of server using the same communication protocol settings and will therefore only operate using a single service, while other applications may connect to a variety of servers using different communication protocols and will require multiple services.

The software modules 221 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

In some embodiments, the auxiliary input/output (I/O) subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS transceiver for communicating with a GPS satellite network (not shown). The auxiliary I/O subsystems 250 may comprise a pointing or navigational tool (input device) such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile device 201 to the host computer system via a USB cable or Bluetooth® connection, traffic that was destined for the wireless network 101 is automatically routed to the mobile device 201 using the USB cable or Bluetooth® connection. Similarly, any traffic destined for the wireless network 101 is automatically sent over the USB cable or Bluetooth® connection to the host computer system for processing.

The mobile device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional component which provides for communication between the mobile device 201 and different systems or devices, which need not necessarily be similar devices. In some example embodiments, the mobile device 201 may implement near field communications (NFC) using the NFC module 292. In some example embodiments, the subsystem 262 may include an infrared device and associated circuits and components, or a wireless bus protocol compliant communication mechanism such as a Bluetooth® communication module to provide for communication with corresponding or similarly-enabled systems and devices.

A predetermined set of applications that control basic device operations, including data and possibly voice communication applications will normally be installed on the mobile device 201 during or after manufacture. Additional applications and/or upgrades to the operating system 223 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and an optional voice communication mode. In the data communication mode, a received data signal such as a short message (e.g. short message service (SMS), Multimedia Messaging Service (MMS)), an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information.

Figure 4:
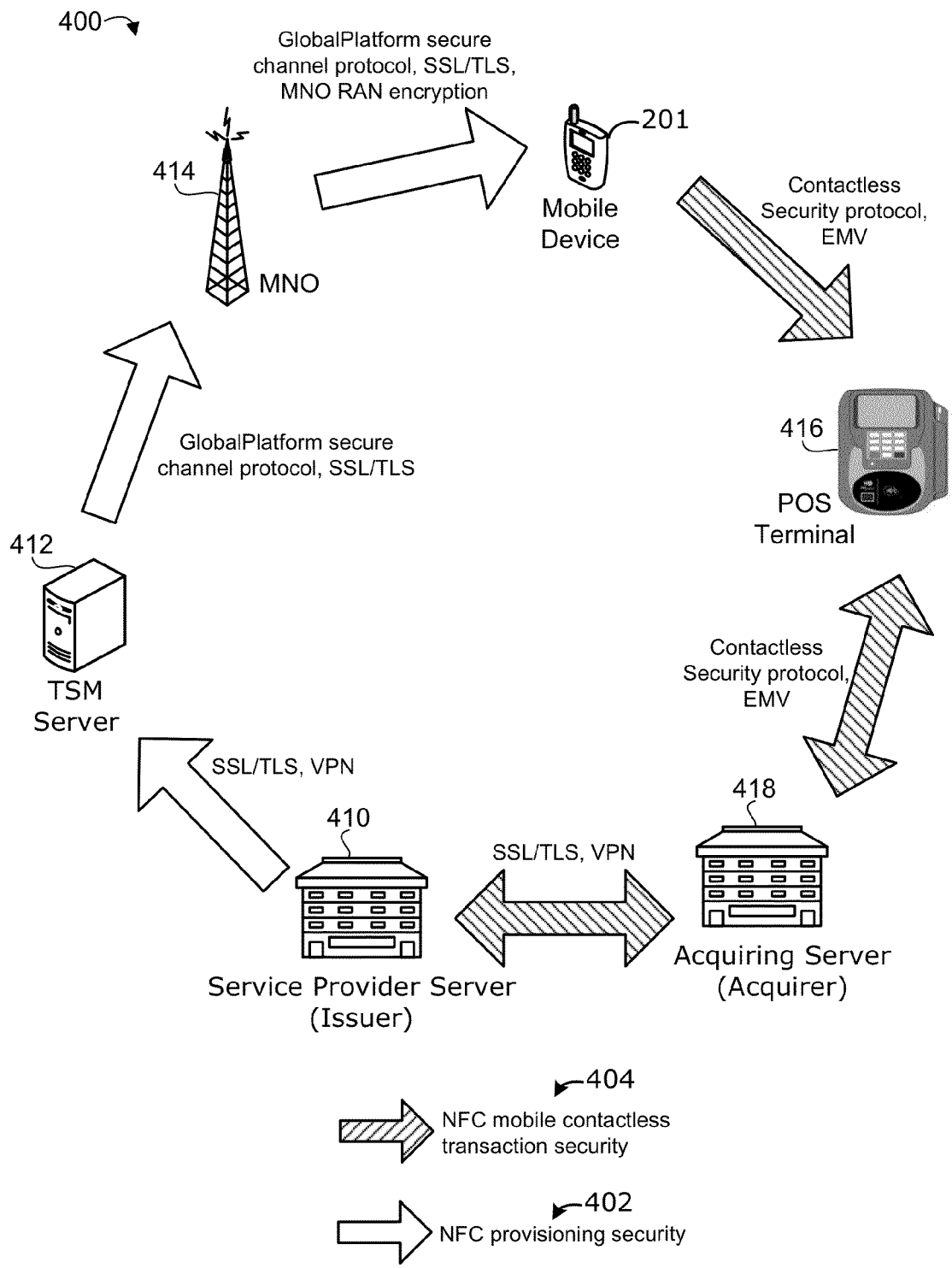
FIG. 4 illustrates a block diagram of another communications system to which embodiments may be applied, illustrating a mobile payment system.

Reference is now made to FIG. 4, which illustrates a mobile payment system 400 in accordance with an example embodiment. In some example embodiments, the mobile payment system 400 may generally use the secure element 227 to securely enable payments facilitated by the NFC module 292 of the communication device 201. The mobile payment system 400 may generally be used to provide services which may include at least a provisioning security service 402 and a mobile transaction security service 404.

Still referring to FIG. 4, the provisioning security service 402 is generally used to provide security information such as user information or credit card account information to the secure element 227 of the communication device 201. For example, the provisioning security service 402 may include a service provider server 410, a trusted service manager (TSM) server 412, a mobile network operator (MNO) 414, and the communication device 201.

Example embodiments of the provisioning security service 402 may include secure communication protocols such as using public key infrastructure (PKI) and encryption based on Secure Sockets Layer (SSL)/Transport Layer Security (TLS). In some example embodiments, the secure communication protocols may include virtual private network (VPN). Generally, in order to securely deliver financial data or account information to the communication device 201, the data from the service provider server 410 is passed securely through the TSM server 412 to the secure element 227.

Referring again to FIG. 4, the service provider server 410 may sometimes be operated by an "issuer". The service provider server 410 may, in some example embodiments, be provided by an issuing financial institution.

The TSM server 412 may be used as a trusted source to perform key management and security. The key management process maintains security of the keys. The TSM server 412 may include both physical security and logical security. For example, physical security may prevent physical access to a key management server (KMS) and related hardware security module (HSM). Physical security may include the use of man traps, physical barriers, and alarm systems. Logical security may include processes, procedures, and software used to safeguard the keys. Examples of logical security include password requirements, key import requirements and procedures, firewall rules, and the use of proxy systems for communications.

In some example embodiments of the provisioning security service 402, the TSM server 412 stores user account information in an encrypted database. When the communication device 201 requires set-up or provisioning of the account information, the following three separate layers of encryption may be established with a packet data connection:

1) The mobile device establishes an over-the-air (OTA) packet connection across the MNO's 414 radio access network (RAN). This OTA communication is encrypted at OSI layer 1, based on protocols established by both the CDMA and GSM standards, as understood in the art. Security at this point is controlled by the MNO 414, because the MNO 414 manages the keys used to encrypt the data traffic. Data encryption on the MNO network facilitates privacy and confidentiality for data traffic between the MNO 414 and the communication device 201. The OTA encryption layer adds another barrier to the potential for custody breach of account data due to radio sniffing.

2) Once the packet connection is established, the application manager 272 of the communication device 201 establishes a TLS secure communication session to the TSM server 412 at OSI layer 4, using credentials issued by a trusted certificate authority (CA).

3) When this connection is established, the TSM server 412 initiates another secure connection to the NFC module 282 to access the secure element 227 using a secure channel protocol, which can be implemented at OSI layer 7. This layer of encryption is secured by keys that belong to the service provider server 410 (e.g. issuer or a financial institution).

In some example embodiments, the application layer security leverages multiple protection levels. After the last connection is established, at least one logical layer of encryption, secured by the issuing server's 410 keys, protects the data between the TSM server's 412 and the secure element 227. In some example embodiments, at least two layers of encryption protect the data across the secured communication channels. While data is traveling over the air, it may always be secured by these three layers of encryption.

Still referring to FIG. 4, the mobile transaction security service 404 is generally used to process a payment transaction using the account information from the secure element 227. For example, the mobile transaction security service 404 may include the communication device 201, a contactless reader such as a point of sale (POS) terminal 416, an acquiring server 418, and the service provider server 410.

While the POS terminal 416 and the secure element 227 are in communication, the NFC module 292 may implement a card emulation mode. For example, the POS terminal 416 communicates with the NFC module 292 to identify which card is being emulated. The POS terminal 416 may then send commands appropriate for a card type (e.g. Visa payWave, MasterCard PayPass, American Express, Discover Zip, or other card) to start communication with a specific applet 290. The payment transaction may then be performed much like a contactless credit or debit card transaction. The communication device 201 is presented to the POS terminal 416 at the point at which a contactless payment card would be presented. The POS terminal 416 may initiate the transaction (rather than the communication device 201), and the POS terminal 416 may not attempt to read the communication device 201 until the transaction is initiated. When transaction communication between the communication device 201 and the POS terminal 416 is being processed or is completed, the terminal may output a suitable message on a display. Similarly, a device application 274 of the communication device 201 may output a suitable message on the display 204 (FIG. 2).

Referring still to FIG. 4, the POS terminal 416 may communicate using a contactless security protocol, for example using ISO 7816 and ISO 14443, as understood in the art. The data structure for the communication may include an application protocol data unit (APDU), as defined by ISO 7816-4, as understood in the art. The POS terminal 416 may communicate to implement Europay, MasterCard and VISA (EMV), as understood in the art.

Referring again to FIG. 2, an example of a device application 274 is an application which facilitates a user making a payment transaction and may require the user to enter a passcode or present a fingerprint to an input device 206 of the communication device 201, to initiate or respond to the terminal's transaction initiation or to validate the transaction from the perspective of the NFC module 292. If the communication device 201 has multiple device applications 274, each may have different user requirements for conducting a transaction.

For example, a communication device 201 may include the following configuration options: always allow access to the applet 290 (e.g. card is always available); allow access to the applet 290 only after user confirmation; and only allow access to the applet 290 upon input of the correct passcode or fingerprint.

In some example embodiments, more than one applet 290 is installed in the secure element 227, and a mobile wallet application may be used to manage the multiple applets 290. The wallet application enables the user to select a preferred payment or issuer brand for each transaction, analogous to a consumer opening a wallet or purse and selecting the card to use for a transaction.

The mobile wallet application may also enable the user to designate one brand as a default payment brand. For example, if a user primarily uses a specific credit or debit card, that application can be set as the default payment brand. To use a different payment account in a retail outlet, the user may select a different payment brand.

In some example embodiments, a MIDlet may be used when the communication device 201 is configured for Java 2-based implementations. For example, the communication device 201 may be configured to automatically open a MIDlet that displays a particular logo when a certain application or applet is selected. For example, when a bank payment application is used, the logo of that bank may then be displayed on the communication device 201 during or immediately after the transaction.

In an example implementation, the POS terminal 416 initiates communication with the NFC module 292 of the communication device 201. The POS terminal 416 may be configured to not constantly scan a scanning area for the communication device 201; rather, the POS terminal 416 may only attempt to locate the communication device 201 when the POS terminal 416 prompts the user to present the communication device 201. Once the communication device 201 is located, communication between the POS terminal 416 and the communication device 201 may take place. In some example embodiments, the scanning area may be e.g. a two to four square-inch range.

When a transaction is completed, a final command or communication may be sent to the communication device 201 by the POS terminal 416. In some example embodiments, the POS terminal 416 does not consider the communication to be complete until the communication device 201 is moved out of the scanning area. For example, another transaction cannot take place until the communication device 201 that executed the previous transaction is moved completely away from the scanning area and the cashier or vendor initiates a new transaction.

Proximity mobile payments may use the standard ISO/IEC 14443, as understood in the art, which governs communication between a contactless credit or debit payment device and a terminal. Payment transactions invoke additional layers of security during transaction processing. For example, the first layer of security is provided by the secure element 227 itself, which protects the payment applet 290 by storing it in restricted access memory. The payment applet 290 generates a dynamic cryptogram that is integrated into the transaction messaging/communication process with the POS terminal 416. The POS terminal 416 communicates with the acquirer server 418 to verify the transaction. The acquirer server 418 verifies with the service provider server 410 that the card number and transaction amount are both valid, and then the POS terminal 416 processes the transaction with the communication device 201.

Referring still to FIG. 4, in some example embodiments, the secure element 227 of the communication device 201 may only be configured or managed by instructions received from the TSM server 412, either directly or indirectly (e.g. via the NFC module 292). For example, referring again to FIG. 2, the addition, modification, or removal of an applet 290 may only be controlled by the TSM server 412 in some example embodiments. Communications or instructions from the TSM server 412 may be authenticated using at least the PKI. Accordingly, in some example embodiments the secure element 227 may not be directly configurable by the application manager 272 or any of the device applications 274. For example, the application manager 272 or the device applications 274 may not have access to the appropriate keys.

Referring still to FIG. 2, generally, some example embodiments of the mobile device 201 may utilize the NFC module 292 and the secure element 227 to facilitate secure applications or services, such as mobile payment. In some example embodiments, secure data may also be stored on the secure element 227. In some example embodiments, associated secure data may be encapsulated within an applet 290. In some example embodiments, deletion of an applet 290 results in associated data encapsulated within that applet 290 to also be deleted.

Referring still to FIG. 2, in some example embodiments, secure element 227 may be protected by way of software-based encryption and/or hardware-based security protection. This may include the use of the secure element 227 within Universal subscriber identity module (USIM) or SIM cards using "smart chips", embedded secure elements, or Secure Digital (SD) cards.

In some example embodiments, the smart chips include multi-layer security architecture. Security features may be manufactured into the secure microcontrollers used in smart card chips which may prevent attackers from accessing sensitive information stored on the card. The smart card chips may include built-in tamper-resistance. The smart card chips may include a variety of hardware and software capabilities that detect and react to tampering attempts and help counter possible attacks. For example, the smart card chips may be manufactured with features such as extra metal layers, sensors to detect thermal and UV light attacks, and additional software and hardware circuitry to prevent differential power analysis. In some example embodiments, similar security features may be used for embedded secure elements 227.

Referring again to FIG. 2, the secure element 227 may include a security domain architecture to enable the service provider server 410 to perform key management and applet verification during load and installation processes. The secure element 227 may include an issuer security domain (ISD) which generally allows an applet 290 to be loaded into the secure element 227. The ISDs may be managed by the card manager 294. In some example embodiments, the secure element 227 may also include one or more supplemental security domains (SSDs).

The ISD is the portion of the secure element 227 in which the MNO 414 may store the keys for OTA provisioning, card content management, and security domain management. The ISD has privileges for global management, authorized management, and security domain management for the secure element 227. In some example embodiments, the ISD may be created at the manufacturing level by a device manufacturer (not shown) and the key for card content management is securely transferred from the manufacturer to the MNO 414. The ISD may authorize the creation of any SSDs. In some example embodiments, only the ISD has the privileges to create an SSD and assign authorized or delegated management privileges.

The SSDs can be security domains assigned to the TSM server 412 or to the service provider servers 410 (such as credit card, ticket, prepaid/loyalty card, or transit card issuers). In addition, the secure element 227 may have a controlling authority security domain (CASD). Each SSD may have its own card manager key for loading applications. The ISD can assign different sets of privileges (based, for example, on different business relationships) to the SSD designated as the TSM security domain and the SSD designated as the service provider security domain.

Figure 3A:
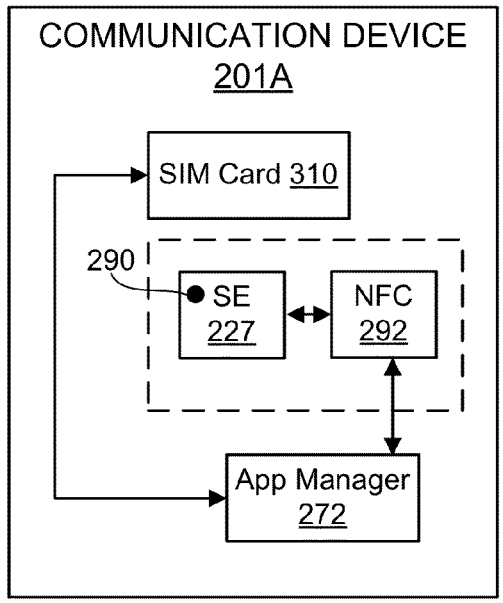
FIG. 3A shows a block diagram showing another example embodiment of a mobile communication device, having an embedded secure element and a subscriber identity module (SIM) card.

Additional configurations of the mobile communication device 201 will now be described, with reference to FIGS. 3A, 3B, 3C and 3D. FIG. 3A shows an example configuration of the mobile communication device 201A in accordance with another example embodiment. As shown in FIG. 3A, the secure element 227 is embedded in the mobile communication device 201A. The NFC module 292 acts as a proxy or router with the applets 292 of the secure element 227. The application manager 272 communicates with the applets 292 via the NFC module 292. The application manager 272 may also communicate with a subscriber identity module (SIM) card 310.

Figure 3B:
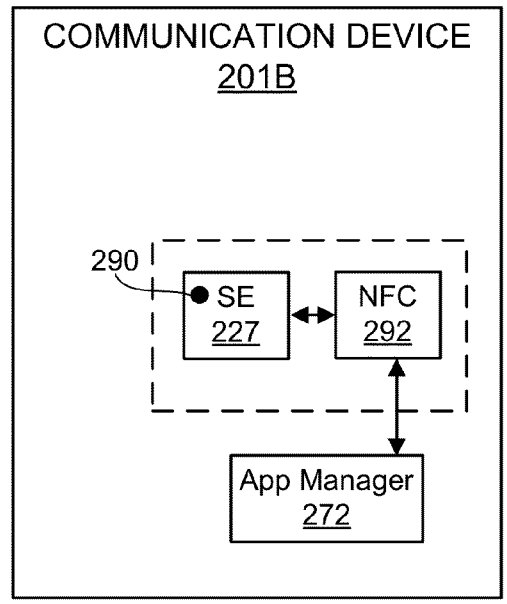
FIG. 3B shows a block diagram showing another example embodiment of a mobile communication device, having an embedded secure element.

FIG. 3B shows another example configuration of the mobile communication device 201B in accordance with another example embodiment. As shown in FIG. 3B, the secure element 227 is embedded in the communication device 201B. The NFC module 292 acts as a proxy or router for permitting access to the applets 292 of the secure element 227. The application manager 272 communicates with the applets 292 via the NFC module 292. In the example embodiment shown, there may be no SIM card 310.

Figure 3C:
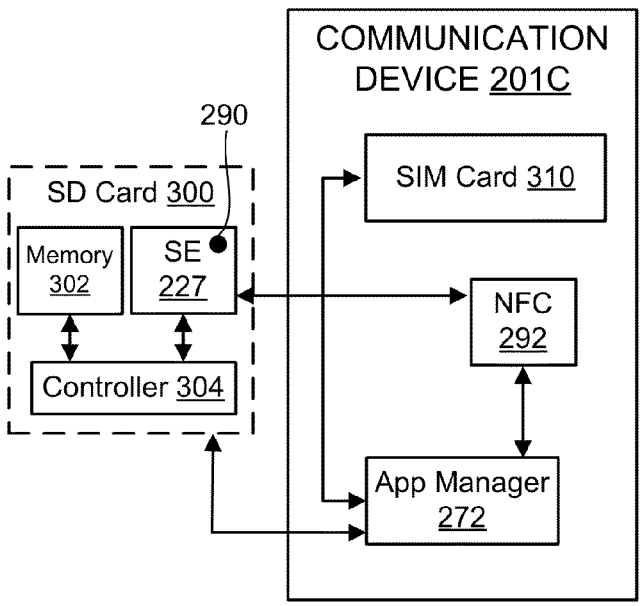
FIG. 3C shows a block diagram showing another example embodiment of a mobile communication device, having a secure element stored on a Secure Digital (SD) card.

FIG. 3C shows another example configuration of the mobile communication device 201C in accordance with another example embodiment. As shown in FIG. 3C, the secure element 227 is stored on a Secure Digital (SD) card 300. In some example embodiments, the SD card 300 includes its own memory 302 and controller 304. The NFC module 292 acts as a proxy or router for the applets 292 of the secure element 227. The application manager 272 may also communicate with the SD card 300 and the SIM card 310.

Figure 3D:
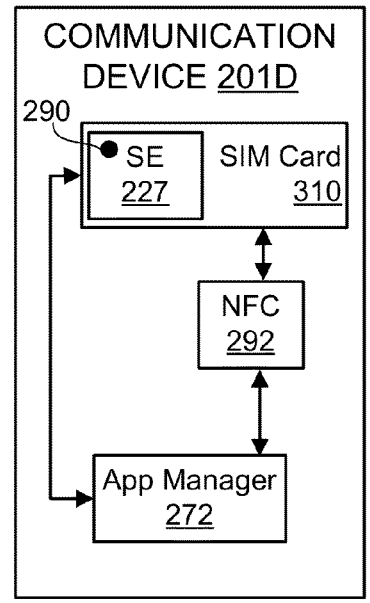
FIG. 3D shows a block diagram showing another example embodiment of a mobile communication device, having a secure element stored on a SIM card.

FIG. 3D shows another example configuration of the mobile communication device 201D in accordance with another example embodiment. As shown in FIG. 3D, the secure element 290 is stored on a SIM card 310. The NFC module 292 acts as a proxy or router for the application manager 272. The application manager 272 may also communicate with the SIM card 310.

Referring again to FIG. 4, it would be appreciated that the described mobile payment system 400 is provided for the purpose of illustration only, and that the described mobile payment system 400 comprises one possible communication network configuration of a multitude of possible configurations for use with the mobile communication devices 201. Example embodiments may be employed in connection with any other type of network and associated devices that are suitable in implementing contactless services. Suitable variations of the system 400 will be understood to a person of skill in the art and are intended to fall within the scope of the present example embodiments.

A difficulty with some existing conventional systems is that a user may delete a device application 274 which has an association with an applet 290. However, in some of such systems merely the device application 274 is removed, and the user may be unaware that the applet 290 and any encapsulated data may remain in the secure element 227. This may result in wastage of limited space within the secured element 227, and may result in a breach of security.

In some example embodiments, there is generally provided the removal of any "orphaned" applets 290 from the secure element 227 which are not associated with any device applications 274.

Figure 5:
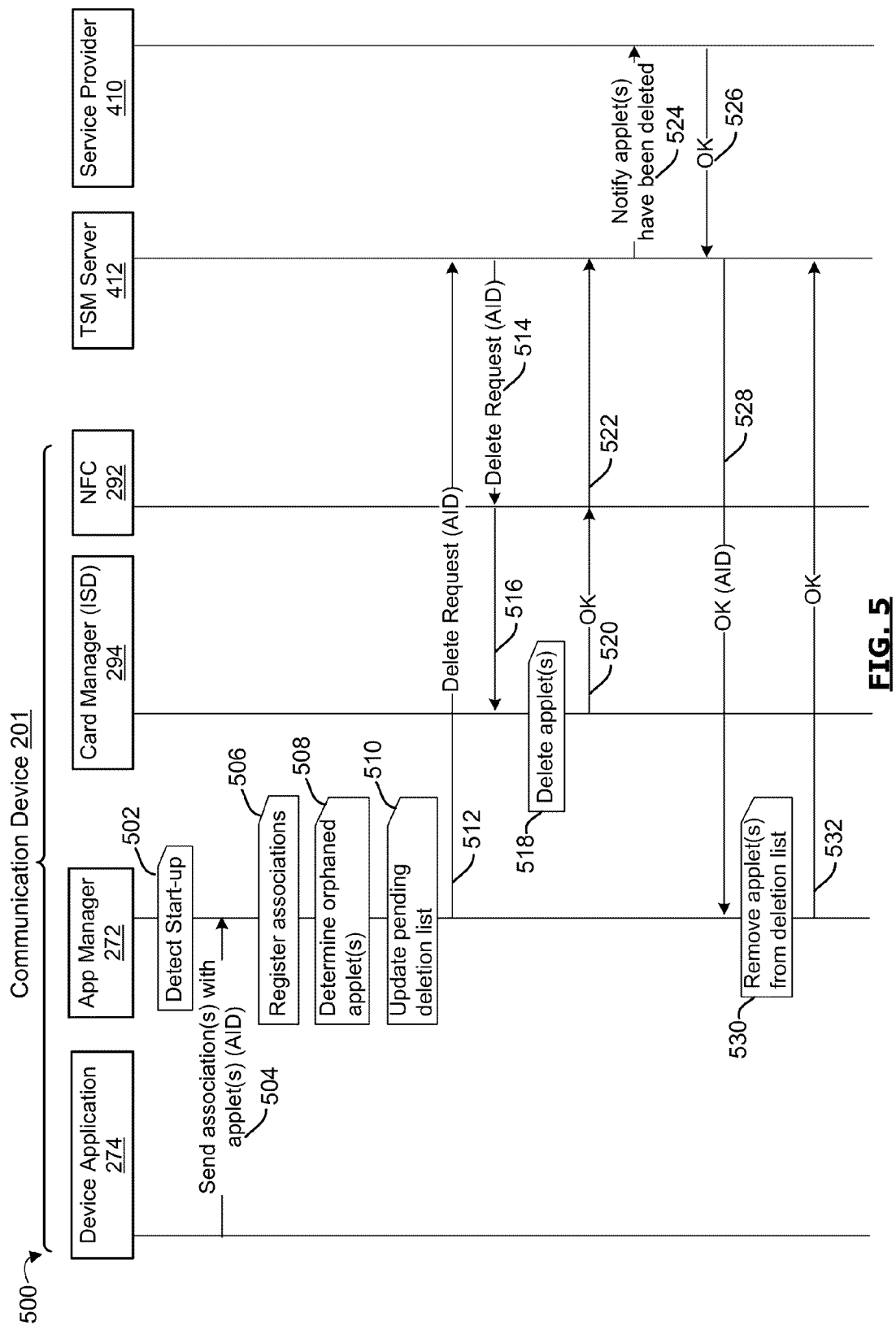
FIG. 5 shows, in flow diagram form, an example conversation for managing a secure element in accordance with an example embodiment.

Reference is now made to FIG. 5, which shows an example method or conversation 500 for managing the secure element 227 in accordance with an example embodiment. As shown, the conversation 500 may involve one or more device applications 274 (one shown), the application manager 272, the card manager 294, the NFC module 292, the TSM server 412, and the service provider server 410. Generally, the conversation 500 may generally include determining that an applet 290 does not have an association with any of the device applications 274, and in response to making that determination, sending a communication to the TSM server 412 to delete the applet 290 from the secure element 227.

In some example embodiments, the conversation 500 begins at event 502, which is the application manager 272 detecting a trigger event such as a start-up of the communication device 201. For example, the communication device 201 may be turned on from an off state. In another example, the communication device 201 has been reset, for example due to the installation or removal of a device application 274. Other example triggers include the installation or removal of a device application 274.

In some example embodiments, one or more of the device applications 274 may be associated with one of the applets 290. For example, an indication or applet identifier (AID) of an applet 290 may be used to determine the association. An example of such a device application 274 is a mobile wallet application which may include a user interface. The mobile wallet application may interact with an applet 290, and facilitate payment transaction logging or tracking, user prompting, additional passwords, etc. In some example embodiments, more than one device application 274 may each be associated with more than one applet 290 (many-to-many). In some example embodiments, other example relationships between the device applications 274 and applets 290 may include one-to-one, one-to-many, and many-to-one.

At event 504, any of the device applications 274 which are associated with a particular applet 290 each send a communication to the application manager 272, indicating association with one or more applets 290 and identifying those applets using the AID.

At event 506, in some example embodiments the application manager 272 stores all of the received indications in a registry contained in memory. In some example embodiments, the application manager 272 stores one or more such indications of the received associations in a volatile memory such as RAM 246. For example, the indications of the stored associations may be cleared upon shut-down or reset of the communication device 201.

At event 508, the application manager 272 determines, from the indications, which applets 290 do not have an association with any of the device applications 274. For example, those applets 290 may be identified using the AID. Such applets 290 may be considered to be "orphaned" and flagged for removal. At event 510, those applets 290 are then listed onto a pending deletion list, which may be stored on the flash memory 244.

In some other example embodiments, at event 508 applets 290 are identified which do not have an association with any of the device applications 274 for a specified number of successive start-ups of the communication device 201. For example, the specified number may be two successive start-ups. For example, an initial installation of an application 274 may require a reset of the communication device 201. Upon reset, an association with between a device application 274 and the applet 290 may not have been established yet. By determining an applet 290 has been orphaned for two successive start-ups, this assists in avoiding any applets 290 from being accidently flagged for the deletion list. The first instance of any identified orphaned applets may be stored on a persistent memory such as flash memory 244, in such example embodiments. Similarly, the instances of any identified orphaned applets prior to the specified number of successive start-ups may be stored on the persistent memory.

Referring still to FIG. 5, at event 512 the application manager 272 sends a communication to the TSM server 412 for deletion of the applets 290 on the pending deletion list identified using the AID. For example, in some example embodiments the secure element 227 may only be configured or managed by instructions received from the TSM server 412. At event 514, the TSM server 412 sends a communication to the NFC module 292 to delete the identified applet(s) 290 from the secure element 227. At event 516, the communication is passed through to the card manager 294.

At event 518, the card manager 294 deletes the identified applet(s) 290 from the secure element 227. In some example embodiments, deletion of the applet 290 results in associated data encapsulated within that applet 290 to also be deleted. In some example embodiments, deletion further includes deletion of appropriate emulation layers, drivers, and tokens. At event 520, the card manager 294 sends a communication to the NFC module 292 which confirms deletion of the applet(s) 290, which is forwarded to the TSM server 412 at event 522.

At event 524, the TSM server 412 sends a communication to each service provider server 410 that the associated applet 290 has been deleted. At event 526, the service provider server 410 sends a communication to the TSM server 412 confirming receipt.

At event 528, the TSM server 412 sends a communication to the application manager 272 confirming deletion of the identified applet(s) 290. The communication at event 528 may also include an instruction to remove the applet(s) 290 from the pending deletion list. At event 530, the application manager 272 removes the applet(s) 290 from the pending deletion list. At event 532, the application manager 272 sends a communication to the TSM server 412 confirming receipt and deletion.

Referring still to FIG. 5, in some other example embodiments, at event 506 the application manager 272 stores the received associations in a persistent registry in a persistent memory such as flash memory 244.

Figure 6:
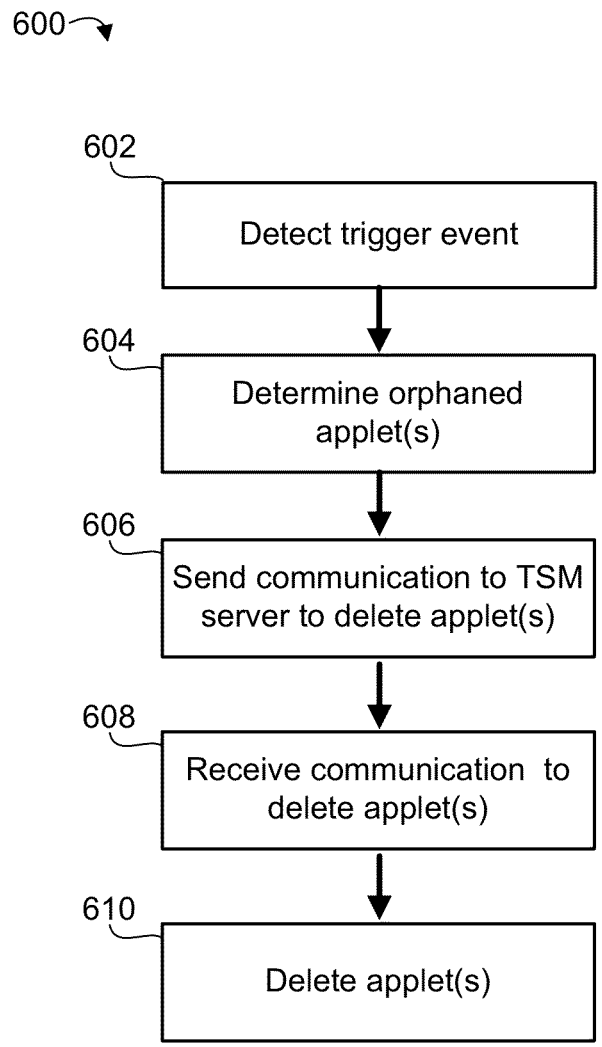
FIG. 6 shows, in flow diagram form, an example method for managing, from a communication device, a secure element from a communication device in accordance with an example embodiment.

FIG. 6 shows, in flow diagram form, an example method 600 for managing, from the communication device 201, the secure element 227, in accordance with an example embodiment. Generally, the method 600 generally assists in removing any "orphaned" applets 290 from the secure element 227 which are not associated with any device applications 274. In some example embodiments, the method 600 begins at event 602 with the detection of a trigger event, such as a device start-up of the communication device 201.

At event 604, the application manager 272 determines that one or more applets 290 stored on the secure element 227 do not have an association with any of the device applications 274. The applets 290 which are orphaned may be identified using the applet identifier (AID). In some example embodiments, event 604 may include receiving, from one or more device applications 274, communications indicating association with one or more of the applets 290. At event 606, the application manager 272, in response to satisfaction of the determining at event 604, sends a communication to the TSM server 412 to delete the identified applet(s) 290 from the secure element 227.

At event 608, the NFC module 292 receives a communication from the TSM server 412 to delete the applet 290 from the secure element 227. At event 610, in response, the NFC module 292 communicates with the card manager 294 to delete the applet(s) 290 and any associated encapsulated data from the secure element 227.

While some example embodiments have been described as relating to mobile payment systems, it would be appreciated that some example embodiments may be applied to other applications or services which may use a secure element and/or a contactless element, including without limitation exchanging data, peer-to-peer communications, configuration or Bluetooth® pairing, vending machines, service maintenance, loyalty or couponing, information posting or retrieval, ticketing, medical, home care, web applications, access control, mobile signature, and/or security badge identification for building access.

While some of the present embodiments are described in terms of methods, a person of ordinary skill in the art will understand that present embodiments are also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present example embodiments.

While some of the above examples have been described as occurring in a particular order, it will be appreciated to persons skilled in the art that some of the messages or steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps of the conversations may be repeated, as necessary. Elements described as methods or steps similarly apply to systems or subcomponents, and vice-versa. Reference to such words as "sending" or "receiving" could be interchanged depending on the perspective of the particular device.

The term "computer readable medium" as used herein includes any medium which can store instructions, program steps, or the like, for use by or execution by a computer or other computing device including, but not limited to: magnetic media, such as a diskette, a disk drive, a magnetic drum, a magneto-optical disk, a magnetic tape, a magnetic core memory, or the like; electronic storage, such as a random access memory (RAM) of any type including static RAM, dynamic RAM, synchronous dynamic RAM (SDRAM), a read-only memory (ROM), a programmable-read-only memory of any type including PROM, EPROM, EEPROM, FLASH, EAROM, a so-called "solid state disk", other electronic storage of any type including a charge-coupled device (CCD), or magnetic bubble memory, a portable electronic data-carrying card of any type including COMPACT FLASH, SECURE DIGITAL (SD-CARD), MEMORY STICK, and the like; and optical media such as a Compact Disc (CD), Digital Versatile Disc (DVD) or BLU-RAY (R) Disc.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the present disclosure, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A method for managing, from a communication device, a secure element, the communication device having a non-secure-element memory for storing one or more device applications, the method being performed by the communication device and comprising:
   determining that an application stored on the secure element does not have an association with any of the device applications stored on the non-secure-element memory;
   in response to said determining, sending a communication to a server to delete the application from the secure element;
   receiving, from the server, a communication to delete the application from the secure element, the communication from the server being received by a communication proxy of the secure element; and
   in response to said receiving, sending a communication to the secure element to delete the application from the secure element.

2. The method as claimed in claim 1, further comprising storing to the non-secure-element memory one or more indications from one or more of the device applications indicating association with one or more applications stored on the secure element.

3. The method as claimed in claim 1, wherein the secure element is configurable by instructions received from the server and not from the communication device or the device applications.

4. The method as claimed in claim 1, wherein the communication proxy includes a contactless element or a near field communication (NFC) module.

5. The method as claimed in claim 1, wherein said determining is in response to a start-up of the communication device.

6. The method as claimed in claim 1, wherein said determining determines that the application stored on the secure element does not have an association with any of the device applications for a specified number of successive start-ups of the communication device.

7. The method as claimed in claim 1, wherein the non-secure-element memory is configured to store one or more indications of associations between any of the device applications and any applications stored on the secure element.

8. The method as claimed in claim 1, wherein the server includes a trusted service manager (TSM) server.

9. A communication device, comprising:
   a processor;
   non-secure-element memory for storing one or more device applications;
   a secure element; and
   a communication subsystem for sending and receiving communications with a server,
   the processor configured for:
   determining that an application stored on the secure element does not have an association with any of the device applications stored on the non-secure-element memory, and
   in response to said determining, sending a communication to the server to delete the application from the secure element; and
   a communication proxy configured for receiving, from the server, a communication to delete the application from the secure element, wherein in response the communication proxy sends a communication to the secure element to delete the application from the secure element.

10. The communication device as claimed in claim 9, wherein the processor is further configured for storing to the non-secure-element memory one or more associations from one or more of the device applications indicating association with one or more applications stored on the secure element.

11. The communication device as claimed in claim 9, wherein the secure element is configurable by instructions received from the server and not from the communication device or the device applications.

12. The communication device as claimed in claim 9, wherein the communication proxy comprises a contactless element or a near field communication (NFC) module.

13. The communication device as claimed in claim 9, wherein said determining is in response to a start-up of the communication device.

14. The communication device as claimed in claim 9, wherein said determining determines that the application stored on the secure element does not have an association with any of the device applications for a specified number of successive start-ups of the communication device.

15. The communication device as claimed in claim 9, wherein the non-secure-element memory is configured to store one or more indications of associations between the device applications and the applications stored on the secure element.

16. The communication device as claimed in claim 9, wherein the server includes a trusted service manager (TSM) server.

17. A non-transitory computer readable medium having stored thereon instructions executable by a processor of a communication device for managing a secure element of the communication device, wherein a non-secure-element memory of the communication device stores one or more device applications, the instructions comprising instructions for:
   determining that an application stored on the secure element does not have an association with any of the device applications stored on the non-secure-element memory;
   in response to said determining, sending a communication to a server to delete the application from the secure element;
   receiving, from the server, a communication to delete the application from the secure element, the communication from the server being received by a communication proxy of the secure element; and
   in response to said receiving, sending a communication to the secure element to delete the application from the secure element.

18. The non-transitory computer readable medium as claimed in claim 17, wherein the instructions further comprise instructions for storing to the non-secure-element memory one or more indications from one or more of the device applications indicating association with one or more applications stored on the secure element.

19. The non-transitory computer readable medium as claimed in claim 17, wherein the communication proxy includes a contactless element or a near field communication (NFC) module.

20. The non-transitory computer readable medium as claimed in claim 17, wherein the server includes a trusted service manager (TSM) server.

* * * * *